United States Patent [19]
Thomas

[11] 3,783,267
[45] Jan. 1, 1974

[54] EXTENDIBLE VEHICLE LIGHT MOUNT

[76] Inventor: Robert E. Thomas, 1323 N. Spurgeon St., Santa Ana, Calif. 92701

[22] Filed: July 21, 1972

[21] Appl. No.: 273,729

[52] U.S. Cl.................. 240/57, 240/7.1 R, 240/49, 340/87
[51] Int. Cl............................................. B60g 1/00
[58] Field of Search ................ 240/57, 52 R, 7.1 E, 240/7.1 R, 3, 49; 182/2; 340/87

[56] References Cited
UNITED STATES PATENTS

| | | | |
|---|---|---|---|
| 3,579,184 | 5/1971 | Forestal | 340/87 |
| 3,287,548 | 11/1966 | Kompier | 240/57 X |
| 3,229,945 | 1/1966 | Hartman | 240/57 X |
| 2,616,768 | 11/1952 | Stemm | 182/2 |
| 3,480,109 | 11/1969 | Eitel et al. | 182/2 X |
| 2,377,279 | 5/1945 | Stewart | 182/2 X |
| 2,073,998 | 3/1937 | Raby | 182/2 X |

*Primary Examiner*—Richard L. Moses
*Attorney*—Gordon L. Peterson

[57] ABSTRACT

An extendible vehicle light mount comprising a boom pivotally connectible to the roof of a vehicle for pivotal movement between an elevated position and a retracted position and a light supporting arm pivotally connected to the boom. The boom is elevated by an appropriate linkage which also controls the angular position of the light supporting arm relative to the boom. The vehicle light mount is mounted on the vehicle so that the longitudinal axis of the boom is generally parallel to the longitudinal axis of the vehicle in the retracted position. A warning light is mounted on the light supporting arm so that the warning light is substantially elevated above the roof of the vehicle when the boom is in the elevated position.

14 Claims, 8 Drawing Figures

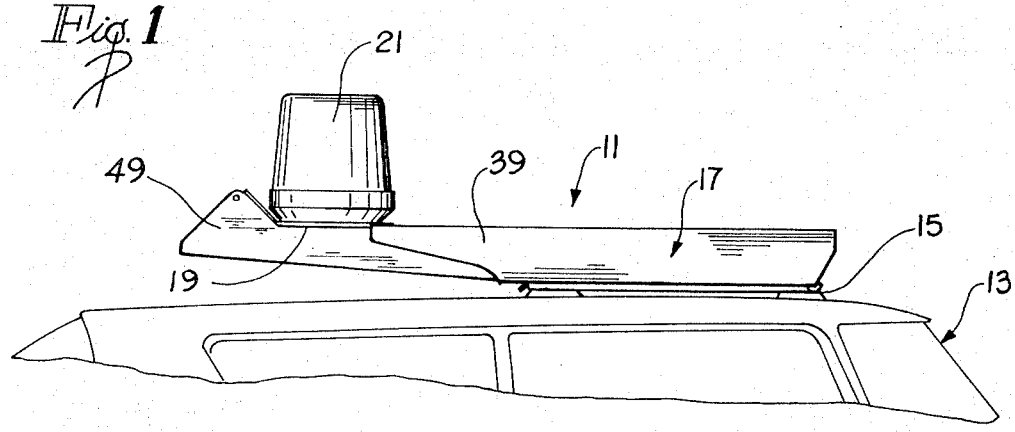
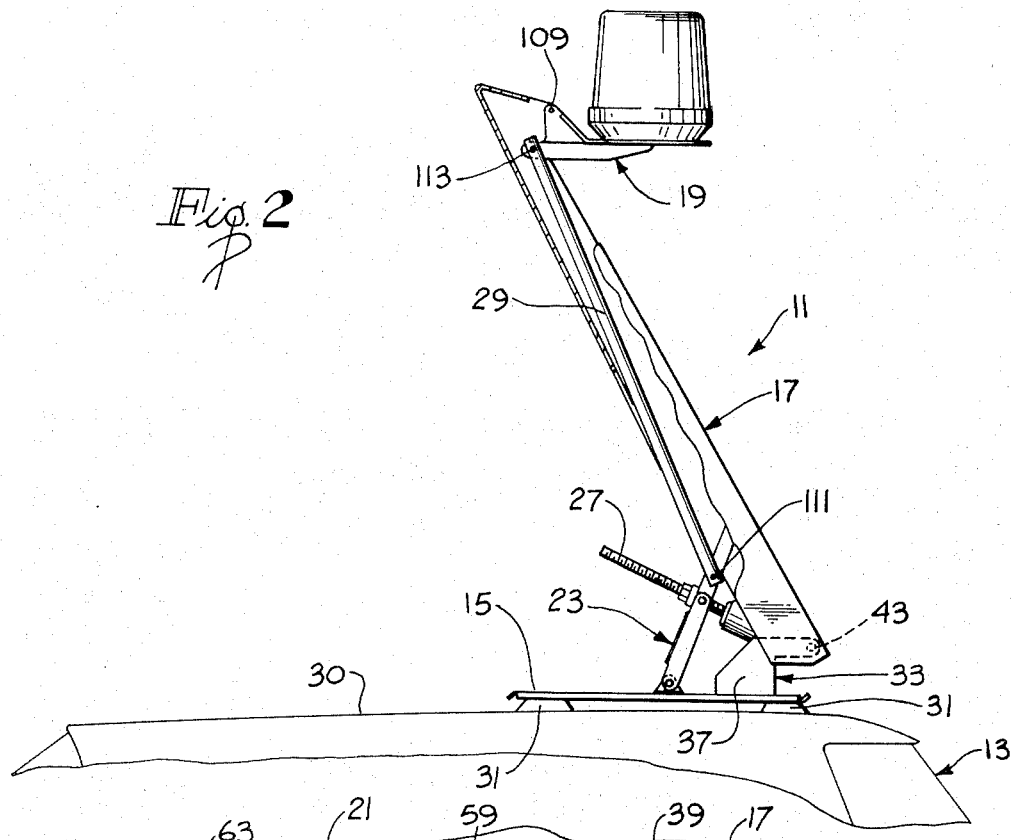
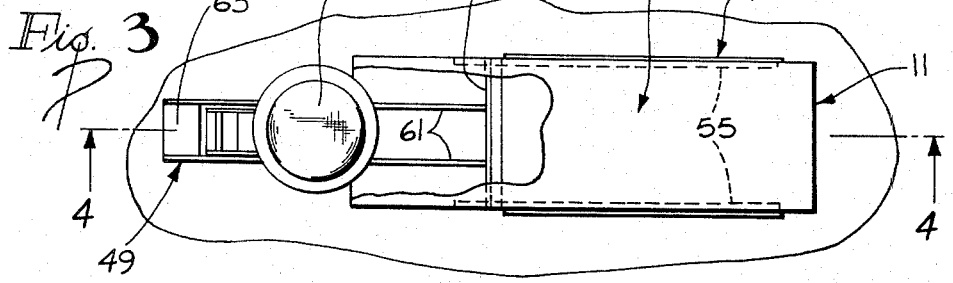

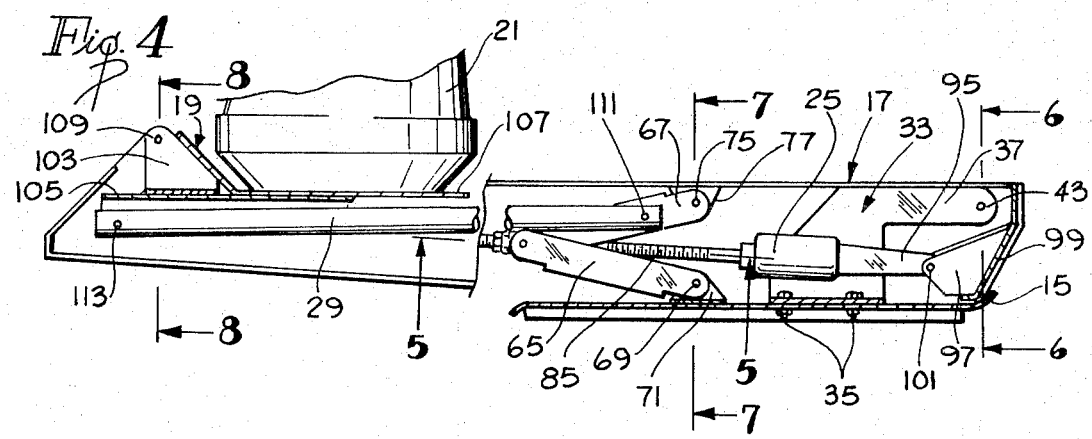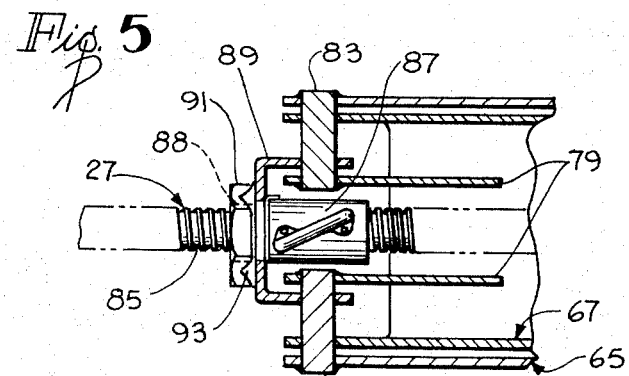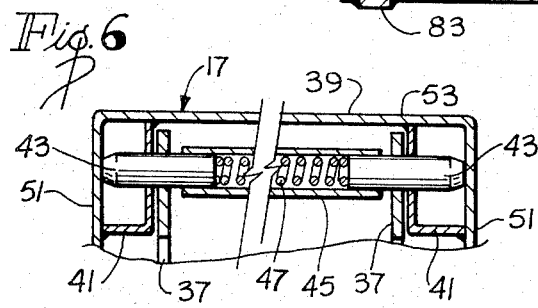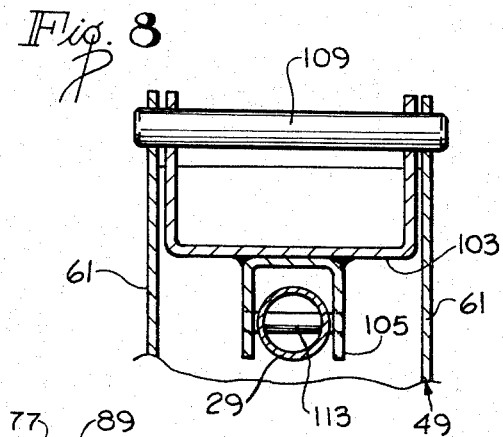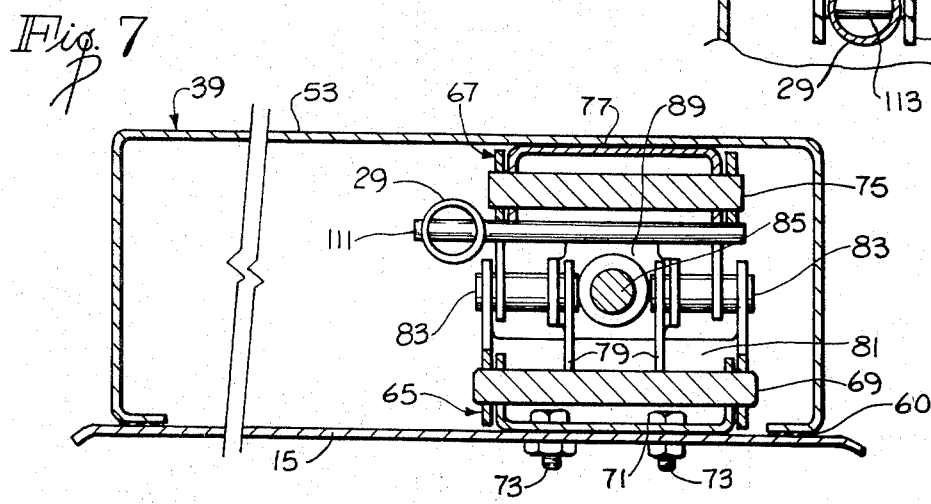

EXTENDIBLE VEHICLE LIGHT MOUNT

BACKGROUND OF THE INVENTION

Emergency vehicles, such as police cars, fire engines, and ambulances, etc. are equipped with sirens and warning lights. This combination of audio and visual stimuli is used to provide a warning of the approaching emergency vehicle.

In some instances, the ambient noise level makes the siren difficult to hear. For example, the noise of the car radio, the air conditioner, or of conversation within a vehicle may make it difficult or impossible for the driver of that vehicle to hear the siren in sufficient time to take the appropriate responsive action. Accordingly, much work has been done to make the siren a more effective warning device.

The vehicle warning light provides a visual indication of the presence of the emergency vehicle, and as such, it may be effective when the siren is not. However, to be effective the warning light must be readily visible. Although the warning light is characteristically mounted on the top of the emergency vehicle, it may be blocked from view by various obstacles such as other vehicles, irregularities in the terrain, etc.

SUMMARY OF THE INVENTION

The present invention makes the warning light a much more effective warning device by enhancing the visibility thereof. This is accomplished by providing a vehicle light mount which selectively elevates the light substantially above the roof of the emergency vehicle.

The vehicle light mount of this invention includes a boom pivotally connected to a support above the vehicle. The boom can be pivoted between an elevated position in which the boom projects upwardly from its pivotal axis and a retracted position in which the boom lies substantially along the roof of the vehicle. A light supporting arm is pivotally connected to the boom at a location remote from the pivotal axis of the boom. A vehicle light is mounted on the light supporting arm. Accordingly, by pivoting of the boom to the elevated position thereof, the warning light is elevated substantially above the roof of the vehicle. This makes the warning light visible from greater distances and reduces the likelihood that the warning light will be blocked from view by another vehicle or by irregular alarm.

On important advantage of the vehicle light mount of this invention is its simplicity. For example, only a single boom and light supporting arm are required. The boom can advantageously include a channel so that, in the retracted position, the channel forms the housing for substantially all of the vehicle light mount. This not only provides a pleasing appearnce, but eliminates the need for a separate container for the vehicle light mount.

The vehicle light mount is preferably oriented so that the longitudinal axis of the boom is generally parallel to the longitudinal axis of the vehicle. With this orientation, the vehicle light mount affords the minimum amount of wind resistance to the vehicle movement when it is in retracted position. In addition, the wind load on the light mount in the extended position can be more readily and sturdily accommodated than if the light mount were oriented transverse to the longitudinal axis of the vehicle.

The extended position of the boom may define a plurality of different positions or boom elevations. The boom can be selectively raised to any one of these positions and, accordingly, the elevation of the warning light on the boom can be selected. The boom can be moved between the extended and retracted positions by a linkage. The linkage can be actuated hydraulically; however, in a preferred form of the invention, the linkage is actuated by an electric motor.

Another advantage of this invention is that the linkage maintains the light support arm and the warning light in a substantially horizontal position as the boom is moved between the retracted and extended positions. By maintaining the warning light horizontal during this interval, the warning light may be fully used as the boom is being pivoted and there is no accompanying loss of the effectiveness of the warning light. In fact, the effectiveness of the warning light increases as it is being elevated.

The vehicle light mount can advantageously include first and second links pivotally connected to the support and to the boom, respectively, and means for pivotally interconnecting the links. The links form a scissors linkage which can be operated to raise and lower the boom. The links can advantageously be operated by a nut and a screw with the screw being driven by an electric motor. In a preferred construction, the nut is attached to the links by pins which also pivotally interconnect the links. In the preferred embodiment, the nut and screw are in the form of a ball screw actuator to reduce friction. The angular orientation of the light supporting arm relative to the boom can be advantageously controlled by a drive element which is pivotally connected to the light supporting arm and to one of the links. The invention also comprises various structural features described more fully hereinbelow.

Another advantage of the present invention is that the boom and the associated linkage may be utilized to elevate various devices to selected heights above a vehicle. For example, different kinds of light such as flood lights or spot lights may be mounted on the light supporting arm. Furthermore, devices other than lights may be mounted on the light supporting arm for elevation above the vehicle. For example, a sign, fire hose, weapon, etc. may be mounted on the light supporting arm.

The invention can best be understood by reference to the following description taken in connection with the accompanying illustrative drawings.

BRIEF DESCRIPTION OF THE DRAWINGS

FIG. 1 is a fragmentary side elevational view of an extendible vehicle light mounted on an emergency vehicle and constructed in accordance with the teachings of this invention. The extendible vehicle light is in the retracted position in FIG. 1.

FIG. 2 is a side elevational view similar to FIG. 1 with parts broken away to expose the interior of the boom and with the boom being in the extended position.

FIG. 3 is a fragmentary top plan view of the extendible vehicle light in the retracted position.

FIG. 4 is a sectional view taken generally along lines 4—4 of FIG. 3.

FIG. 5 is an enlarged, fragmentary sectional view taken generally along line 5—5 of FIG. 4 and showing the connection between the nut of the ball screw and the links.

FIG. 6 is an enlarged, fragmentary sectional view taken generally along lines 6—6 of FIG. 4 showing the means for pivotally mounting the boom.

FIG. 7 is an enlarged sectional view taken generally along lines 7—7 of FIG. 4 and illustrating the means for pivotally connecting the links and for pivotally mounting the links.

FIG. 8 is an enlarged fragmentary sectional view taken generally along lines 8—8 and showing the connection between the light supporting arm and the boom and between the light supporting arm and the drive element.

DESCRIPTION OF THE PREFERRED EMBODIMENT

FIGS. 1-3 show an extendible vehicle light 11 mounted on an emergency vehicle 13 such as a police car. Generally the extendible vehicle light 11 includes a base or support 15, a boom 17 pivotally mounted on the ebase, base, light supporting arm 19 pivotally connected to the outer end of the boom 17, and a warning light 21 suitably mounted on the light supporting arm 19. The boom 17 can be pivoted between a retracted position shown in FIG. 1 and an extended position shown in FIG. 2 by boom operating means such as a scissors linkage 23 which is suitably driven as by a motor 25 and a ball screw actuator 27. The angular orientation of the light supporting arm 19 is controlled by an elongated drive element 29 which is pivotally connected to the scissors linkage 23 and to the light supporting arm 19.

Turning now to a more specific description of the illustrated embodiment of the invention, the base 15 is in the form of a plate which is spaced from a roof 30 of the emergency vehicle 13 by resilient mounts 31 which may be constructed of rubber or similar material. The base 15 is attached to the roof 30 in any suitable manner such as by threaded fasteners (not shown) which project through the base and the resilient mounts 31.

A boom mount 33 in the form of an upwardly opening channel is attached to the base 15 by threaded fasteners 35 (FIG. 4) which project through the web or base of the channel which forms the boom mount. The boom mount 33 has a pair of transversely spaced, upwardly extending flanges 37 (FIGS. 2, 4, and 6).

The boom 17 includes a main channel 39 having interior mounting members in the form of short angles 41 affixed thereto as by welding. The boom 17 is pivotally connected to the flanges 37 by pins 43 (FIG. 6) which extend through the flanges 37 and through one leg of each of the angles 41. The pins 43 are held together as an assembly by a tube 45, and the pins are urged away from each other by a spring 47 carried by the tube. This connection allows the boom 17 to be removed from the flange 37 by urging the pins 43 toward each other against the biasing action of the spring 47. In addition, the main channel 39 conceals the pins 43.

Although the boom 17 could be constructed in different ways, in the embodiment illustrated, it includes the main channel 39 and an outer channel 49 (FIG. 3). The main channel 39 opens downwardly and includes side walls 51 interconnected by web 53 (FIG. 6) and a pair of parallel ledges 55 integral with and projecting inwardly from the side walls 51. A support member in the form of an angle 59 (FIG. 2) having a verticle leg and horizontal leg is affixed to the main channel 39 as by welding and extends transversely thereto. The vertical leg of the angle 59 rests on the ledges 55, and the horizontal leg of the angle 59 terminates flush with the inner edges of the ledges 55. A gasket 60 (FIG. 7) is provided between the main channel 39 and the support 15.

The outer channel 49 opens upwardly and is telescoped with the main channel 39. The outer channel 49 is affixed to the main channel 39 and to the angle 59 in any suitable manner such as by welding. The outer channel 49 includes spaced, parallel flanges 61 interconnected by an integral web 63.

The scissors linkage 23 includes a lower link 65 and an upper link 67 (FIGS. 4, 5 and 7). The links 65 and 67 are substantially identical, and in the embodiment illustrated, each is in the form of an appropriately configured channel. The link 65 is pivotally connected by pin 69 to a mounting bracket 71 which is affixed to the support 15 in any suitable manner such as by threaded fasteners 73. Similarly, the upper link 67 is pivotally mounted by a pin 75 to a mounting bracket 77 which is suitably connected to the web 53 of the main channel 39. As seen in FIG. 7, the lower channel 65 opens upwardly and the upper channel 67 opens downwardly.

The other ends of the links 65 and 67 may be pivotally interconnected in the manner shown in FIG. 5. The lower link 65 has a pair of spaced parallel straps 79 suitably affixed to a web 81 thereof in spaced, paralleled relationship. A pair of pins 83 pivotally interconnect the links 65 and 67 by passing through the flanges of the two links and into the straps 79.

The ball screw actuator 27 (FIGS. 2 and 5) which actuates the scissors linkage 23 may be of conventional construction. The ball screw actuator 27 includes a screw 85, a nut 87, and the usual balls (not shown) for providing a driving relationship between the screw and nut.

The screw 85 and an externally threaded extension 88 of the nut 87 project through an opening in a channel-shaped bracket 89 which is mounted on the pins 83 (FIG. 5). A nut 91 is mounted on the extension 88 and the web of the bracket 89 is clamped between a nut 91 and the nut 87. The nut 91 is locked against rotation relative to the nut 87 by a sheet metal tab 93 which partially embraces the nut 91 at one end and is clamped between the nut 87 and the bracket 89 at the other end.

The motor 25 and the ball screw actuator 27 may be obtained as a unit. A mounting member 95 (FIG. 4) is connected at one end to the motor 25 and is pivotally connected at the other end to a downwardly opening channel 97 which is affixed to an end wall 99 of the boom 17. Thus, the motor 25 and the ball screw actuator 27 can pivot about a horizontal axis defined by a pin 101 which interconnects the mounting member 95 and the channel 97.

Although the light supporting arm 19 can be of various constructions, in the embodiment illustrated, it includes an upwardly opening channel 103, a downwardly opening channel 105 (FIG. 8) and a plate 107 (FIG. 4). The upwardly opening channel 103 is pivotally mounted on the outer channel 49 by a pin 109 which projects through the flanges 61 of the outer channel and the flanges of the upwardly opening channel 103. The downwardly opening channel 105 is suitably affixed to the web of the channel 103 as by welding. The plate 107 is suitably affixed to and supported by the channels 103 and 105 as shown in FIG. 4.

The light 21 is mounted on the plate 107 in any suitable manner. The light 21 may be of conventional design. For example, the light 21 may be a warning light of the type commonly found on the roof of police cars and similar emergency vehicles. As such, the light 21 preferably includes a rotating source of illumination therein.

To control the angular position of the light supporting arm 19, the drive element 29 is pivotally connected as by pins 111 and 113 to the upper link 67 and the downwardly opening channel 105, respectively. The drive element 29 in the embodiment illustrated is in the form of a tube; however, obviously other constructions could be employed. As shown in FIG. 7, the drive element 29 lies substantially centrally within the boom 17 and the links 65 and 67 are offset from a central position within the boom.

The vehicle light 11 can be mounted on the vehicle 13 in different orientations. Preferably, however, the vehicle light 11 lies along the central longitudinal axis of the vehicle 13 with the boom projecting rearwardly of the vehicle from the pin 43 toward the light 21 in the retracted position of the light.

To move the vehicle light 11 to the extended position (FIG. 2) a suitable switch (not shown) is closed to energize the motor 25. The motor 25 rotates the screw 85 of the ball screw actuator 27 in a direction to cause the nut 87 to translate along the screw toward the motor 25. As the nut 87 is affixed to the pins 83 of the scissors linkage 23, such movement of the nut 87 tends to extend or open the scissors linkage. This applies an upward force to the boom 17 which then pivots about its pivot pins 43 (FIG. 2, 4 and 6) toward the extended position.

As the boom 17 is pivoting between the retracted and extended positions thereof, the drive element 29 maintains the plate 107 substantially horizontal. However, as the boom 17 is pivoting clockwise about the pins 43 (as viewed in FIG. 2), there is relative pivotal movement between the light supporting arm 19 and the boom 17 about a pin 109. In the extended position shown in FIG. 2, the warning light 21 can be seen from a much greater distance than in the retracted position. In addition, the upper portions of the boom 17 are located to the rear of the light 21 so as not to block the visibility of the light from the side or front. In the retracted position, the boom 17 provides the vehicle light 11 with a streamlined appearance.

Although an exemplary embodiment of the invention has been shown and described, many changes, modifications and substitutions may be made by one having ordinary skill in the art without necessarily departing from the spirit and scope of this invention.

I claim:

1. An extendible vehicle light connectible to a vehicle comprising:
   a boom;
   means for mounting the boom on the vehicle for pivotal movement about a first pivotal axis between an extended position in which the boom projects upwardly from the first pivotal axis and a retracted position in which the boom is lower than in said extended position;
   first and second links pivotally connected to a support and to the boom, respectively;
   first means for pivotally connecting said links to each other;
   means for operating said links to drive the boom between said positions thereof;
   a light supporting arm;
   a light mounted on the light supporting arm;
   second means for pivotally connecting the light supporting arm and the boom whereby the light supporting arm and the boom can pivot relative to each other; and
   a drive element drivingly connected to one of said links and said light supporting arm whereby operation of said links causes said drive element to pivot the light supporting arm about its pivotal axis whereby the light can be put in the desired attitude in the extended position of the boom.

2. An extendible vehicle light as defined in claim 3 wherein said operating means includes a ball screw actuator drivingly connected to at least one of said links and a motor for driving said ball screw actuator.

3. An extendible vehicle light as defined in claim 1 wherein said operating means includes a nut coupled to said means for pivotally connecting said links, a screw received by said nut and cooperating therewith, and means for providing relative rotation between the nut and the screw.

4. An extendible vehicle light as defined in claim 3 wherein said second means for pivotally connecting includes at least one pin, said extendible vehicle light including a bracket for coupling the nut to the pin.

5. An extendible vehicle light as defined in claim 1 wherein said first and second links are lower and upper links, respectively, the drive element being coupled to the upper link and the light supporting arm.

6. An extendible vehicle light as defined in claim 1 wherein said operating means includes a ball screw actuator drivingly connected to at least one of said links and a motor for driving said ball screw actuator, said boom including an elongated channel, said first and second links being lower and upper links, respectively, said drive element being coupled to the upper link and the light supporting arm in a position to maintain the light supporting arm substantially horizontally as the boom is moved from said retracted position to said extended position.

7. An extendible support structure connectible to a vehicle comprising:
   means defining a support attachable to the vehicle;
   a boom;
   means for mounting the boom on the support for pivotal movement about a first pivotal axis between an extended position in which the boom projects upwardly from the first pivotal axis and a retracted position in which the boom is lower than in said extended position;
   boom operating means pivotally connectible to the support and drivingly coupled to the boom for operating said boom;
   means for driving said boom operating means to thereby drive the boom between said positions thereof;
   a supporting arm adapted to support an object;
   means for pivotally connecting the supporting arm and the boom at a location remote from said first pivotal axis whereby the supporting arm and the boom can pivot relative to each other; and
   means coupled to said supporting arm for controlling the relative pivotal movement between the supporting arm and the boom, said means including an elongated drive element coupled to said supporting arm and extending generally toward said first pivotal axis.

8. An extendible support structure as defined in claim 7 wherein said driving means includes a ball screw actuator drivingly coupled to said boom operating means and a motor for driving the ball screw actuator.

9. An extendible vehicle light mount mountable on a vehicle comprising:
a boom;
means for mounting the boom on the vehicle for pivotal movement about a first pivotal axis between an extended position in which the boom projects upwardly from the first pivotal axis and a retracted position in which the boom is lower than in the extended position;
drive means for moving the boom between said positions thereof;
a light supporting arm adapted to have a light mounted thereon;
means for mounting said light supporting arm on said boom for pivotal movement about a second pivotal axis whereby the boom and the light supporting arm can undergo relative pivotal movement;
means for relatively pivoting said light support arm and said boom about said second axis as said boom is being pivoted about said first axis between said positions thereof so as to cause the light and the arm to project generally horizontally from the boom as the boom is moved from said retracted position to said extended position; and
said boom being in the form of a single rigid arm and said light supporting arm being shorter than said boom and supported in cantilever fashion by said boom.

10. An extendible vehicle light mount comprising:
a vehicle;
a boom;
means for mounting the boom on the vehicle for pivotal movement about a first pivotal axis between an extended position in which the boom projects upwardly from the first pivotal axis and a retracted position in which the boom is lower than in said extended position, said boom extending from the first pivotal axis toward the rear of the vehicle when the boom is in said retracted position;
drive means for pivoting the boom between said positions thereof;
a light supporting arm adapted to have a light mounted thereon;
means for pivotally connecting the light supporting arm and the boom whereby the light supporting arm and the boom can pivot about a second pivotal axis relative to each other, said light supporting arm projecting from said second axis thereof toward the front of the vehicle;
means for causing relative pivotal movement about said second axis between said light supporting arm and said boom to maintain said light supporting arm in the desired attitutde as said boom is pivoted about said first pivotal axis; and
said drive means including a linkage for pivoting said boom, said linkage being located rearwardly of said first axis.

11. An extendible vehicle light mount as defined in claim 10 wherein said axes are generally parallel to each other and generally transverse to the longitudinal axis of the vehicle.

12. An extendible vehicle light mount comprising:
a vehicle;
a boom;
means for mounting the boom on the vehicle for pivotal movement about a first pivotal axis between an extended position in which the boom projects upwardly from the first pivotal axis and a retracted position in which the boom is lower than in said extended position, said boom extending from the first pivotal axis toward the rear of the vehicle when the boom is in said retracted position;
drive means for pivoting the boom between said positions thereof;
a light supporting arm adapted to have a light mounted thereon;
means for pivotally connecting the light supporting arm and the boom whereby the light supporting arm and the boom can pivot about a second pivotal axis relative to each other, said light supporting arm projecting from said second axis thereof toward the front of the vehicle;
means for causing relative pivotal movement about said second axis between said light supporting arm and said boom to maintain said light supporting arm in the desired attitude as said boom is pivoted about said first pivotal axis; and
said boom including a channel opening downwardly in said retracted position of the boom.

13. An extendible vehicle light mount mountable on a vehicle comprising:
a boom;
means for mounting the boom on the vehicle for pivotal movement about a first pivotal axis between an extended position in which the boom projects upwardly from the first pivotal axis and a retracted position in which the boom is lower than in the extended position;
drive means for moving the boom between said positions thereof;
a light suppoting arm adapted to have a light mounted thereon;
means for mounting said light supporting arm on said boom for pivotal movement about a second pivotal axis whereby the boom and the light supporting arm can undergo relative pivotal movement;
means for relatively pivoting said light support arm and said boom about said second axis as said boom is being pivoted about said first axis between said positions thereof so as to cause the light and the arm to project generally horizontally from the boom as the boom is moved from said retracted position to said extended position; and
said last mentioned means including an elongated drive element coupled to said light supporting arm adjacent one end of the drive element and means for mounting said drive element adjacent the other end thereof for pivotal movement relative to the vehicle when the light mount is mounted on the vehicle 14. An extendible support structure as defined in claim 13 including means defining a support attachable to the vehicle, a light mounted on the light supporting arm, and said drive means including boom operating means pivotally connectible to the support and drivingly coupled to the boom for operating said boom and motor means for pivoting said boom operating means to thereby drive the boom between said positions thereof.

* * * * *